(12) United States Patent
Sung et al.

(10) Patent No.: US 7,941,855 B2
(45) Date of Patent: May 10, 2011

(54) COMPUTATIONALLY INTELLIGENT AGENTS FOR DISTRIBUTED INTRUSION DETECTION SYSTEM AND METHOD OF PRACTICING SAME

(75) Inventors: Andrew H. Sung, Socorro, NM (US); Srinivas Mukkamala, Scocorro, NM (US); Jean-Louis Lassez, Conway, SC (US)

(73) Assignee: New Mexico Technical Research Foundation, Socorro, NM (US)

( * ) Notice: Subject to any disclaimer, the term of this patent is extended or adjusted under 35 U.S.C. 154(b) by 2465 days.

(21) Appl. No.: 10/413,462

(22) Filed: Apr. 14, 2003

(65) Prior Publication Data

US 2004/0215972 A1    Oct. 28, 2004

(51) Int. Cl.
*G06F 11/00*    (2006.01)

(52) U.S. Cl. ............... 726/23; 726/22; 726/24; 726/25; 713/188

(58) Field of Classification Search ............. 726/22–25; 713/188; 709/224–229; 706/25, 909
See application file for complete search history.

(56) References Cited

U.S. PATENT DOCUMENTS

2003/0051026 A1 *   3/2003  Carter et al. ............. 709/224
* cited by examiner

*Primary Examiner* — Kimyen Vu
*Assistant Examiner* — Baotran N To
(74) *Attorney, Agent, or Firm* — Robert Becker; Robert Becker & Assoc.

(57) ABSTRACT

A computer-implemented intrusion detection system and method for detecting computer network intrusions in real time are provided. A feature ranking algorithm is used to extract features of interest from a network and network activity. A kernel-based algorithm is used to analyze such features to determine if they are normal or malicious. If malicious, the activity is caused to be blocked.

7 Claims, 3 Drawing Sheets

COMPUTATIONALLY INTELLIGENT AGENTS FOR DISTRIBUTED INTRUSION DETECTION SYSTEM AND METHOD OF PRACTICING SAME

BACKGROUND OF THE INVENTION

The present invention relates to a computer-implemented intrusion detection system (IDS) and method for detecting computer network intrusions in real time.

Computer intrusions and cyber attacks are on the rise. Reports by research organizations and law enforcement agencies indicate, consistently, that the number of computer-security incidents has been increasing geometrically in the last few years. As a countermeasure, organizations have begun to employ intrusion detection systems, in addition to various access control mechanisms, firewalls, and virus scanners, for protection of computer networks and information assets. Current technologies for building IDSs include statistics-based analysis methods, expert systems, learning machines, and software agents.

There are serious drawbacks of currently available IDSs, including the following,
- centralized detection: the computation required for intrusion detection is usually carried out by a single host, resulting in very limited bandwidth in processing traffic data
- lacking real-time performance: as a consequence of the above, the IDS either fails to detect intrusions as they are occurring, or it slows down traffic and takes time to analyze packets for intrusion analysis, at the expense of quality of service provided to users
- low detection accuracy: high rates of false positives (false alarms of intrusion, resulting in waste of resource, and inconvenience/annoyance to users) and false negatives (actual intrusions and attacks went undetected, resulting in financial loss and damage to information asset)
- low pattern-scalability: the number of attack signatures that the IDS is capable of learning is limited
- low network-scalability: the number of hosts on the network that can be protected is limited; further, the configuration of the network being protected may not be changeable
- lacking response capability: the IDS can initiate only very limited, if any at all, response actions upon detecting intrusions
- lacking attacker tracing capability: as a consequence of the above, the IDS is not equipped for tracing attacks and collecting data for forensics
- low adaptability: the IDS is based on detection algorithms that do not allow adjustable thresholds; further, the (learning machine based) IDS needs to be retrained once new attack patterns are known
- inapplicability to wireless networks: the IDS is designed for wired networks and has limited capability in serving networks that allow standard and/or ad-hoc wireless networking It is therefore an object of the present invention to provide an improved computer-implemented intrusion detection system and method for detecting computer network intrusions, especially in real time.

BRIEF DESCRIPTION OF THE DRAWINGS

This object, and other objects and advantages of the present invention, will appear more clearly from the following schematic drawings, in which.

SUMMARY OF THE INVENTION

Figure 2:
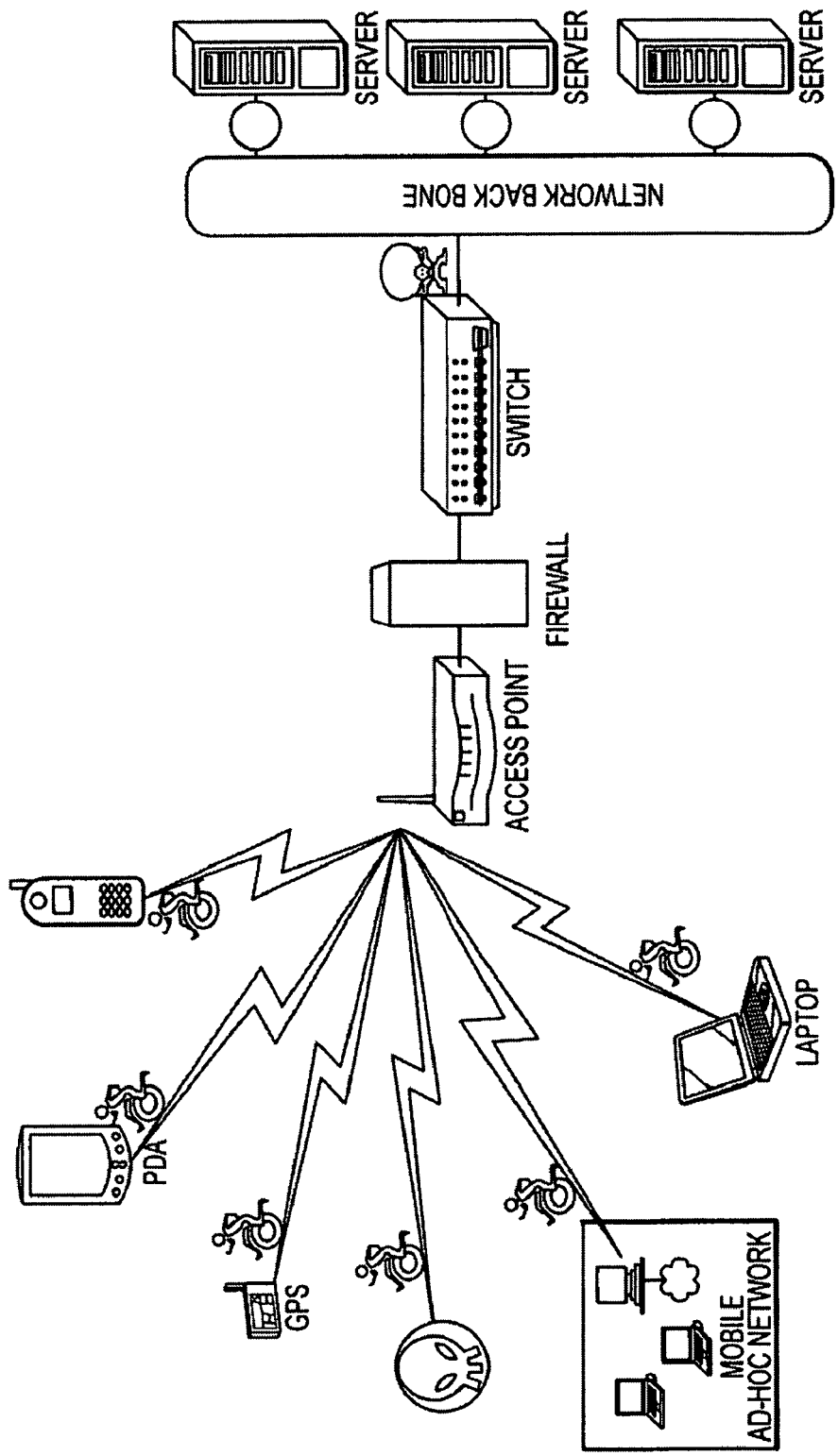
FIG. 2 shows an example of a network configuration.

The present invention provides an intelligent system for real-time computer intrusion detection and is aimed to overcome the drawbacks of current IDSs. The system utilizes intelligent mobile agents that are distributed throughout the network and that cooperate to monitor user activities for detecting intrusions. Three or more types of agents are used to perform the IDS functions, as shown in FIG. 2 where part of an enterprise network is depicted.

- Peripheral Agents: these agents are responsible for device and user authentication, data collection, feature extraction, preliminary intrusion risk assessment, and intrusion response
- Controller Agents: these agents are responsible for general intrusion determination, peripheral agents management, and intrusion response
- Master Agents: these agents are responsible for managing controller agents, updating and modifying user profiles and attack signatures, intrusion determination of more complicated patterns, and intrusion response The mobile agents are equipped with learning algorithms to be capable of intelligent behavior. The agents are further equipped with algorithms to perform vulnerability scanning.

The system utilizes intelligent mobile agents that are distributed throughout the enterprise network to collectively monitor user activities, build user profiles, evaluate intrusion risk, match user activities with known attack patterns and signatures, and perform intrusion determination (i.e., deciding whether an intrusion is really taking place). The system may also be equipped to provide real-time response to intrusions.

The system has the following unique characteristics,
- adaptable: system may be installed to protect networks of different configurations
- scalable: system may be deployed to protect networks of different size
- high performance: system uses kernel-based learning algorithms (such as Support Vector Machines or SVMs) to perform intrusion determination, delivering real-time protection
- intelligent: system may work by deploying mobile agents with learning capabilities to guard various entry points and locations within the network; these agents cooperate in data collection, feature extraction, intrusion determination, attacker tracing, and intrusion response
- wireless capable: system may be installed to protect wired, wireless, and hybrid networks including ad hoc wireless subnets Associated with the IDS design may be a feature selection algorithm that ranks the importance of each feature (in detecting each class of intrusion patterns), by first deleting that feature for consideration and training an IDS, then the performance of the IDS is compared to the original IDS that uses all available features. Those features whose deletion result in improved IDS performance are ranked important features; those features whose deletion result in degraded performance are ranked unimportant features; and those features whose deletion do not affect IDS performance are ranked secondary features.

It is important to note that we are not claiming to have invented the SVM and Intelligent Agent technologies. Rather, we are claiming to have uniquely applied them to the problem of intrusion detection.

The present invention has the following unique features:
1. Kernel-based learning algorithm (e.g., SVMs) for intrusion classification
2. Separate feature ranking algorithm to aid in feature selection for intrusion monitoring
3. Multiple modules for class-specific intrusion determination
4. Intrusion detection modules (IDMs) implemented in intelligent software agents
5. IDS includes "sensitivity selector" to adjust intrusion threshold
6. Additional agents generated and dispatched automatically when IDS-related computation increases
7. Dynamic agents management (assignment/recall/modification)
8. Intelligent software agents capable of learning new attack patterns
9. Intelligent software agents capable of detecting system vulnerability
10. Suitable for wireless network IDS
11. Applicable to all OS and architecture platforms
12. Applicable to all network configurations
13. System capable of detecting anomalous patterns and misuse/attack patterns using IDMs
14. IDS includes prevention and response mechanisms
15. Increased scalability, accuracy, and real-time performance over current IDSs 1. Kernel-Based Learning Algorithm for Intrusion Classification Kernel-based learning algorithms employ kernel functions (mathematical functions) in conjunction with a class of learning machines known as support vector machines (SVMs) to perform pattern classification. SVMs have been investigated by the inventors for IDS applications and have been found to be superior to other learning machines in critical aspects of IDS performance including classification accuracy, running time, and scalability. Using different kernel functions leads to different SVM performance in pattern classification. For implementation details: Please refer to FIG. 1. A good example overview of how a Kernel-based learning algorithm is as follows:

Step 1: A feature extraction algorithm will be utilized to extract the important features from the network and system activities.
   Note: An analysis will or may be made to identify the features and only these will be extracted for identifying intrusions versus normal activities.
Step 2: A suitable kernel based algorithm will or may be applied to identify whether the activity is normal or malicious.
   Note: In our research thus far we have tried SVMs and Neural Networks. SVMs are far superior to Neural Networks in speed and accuracy. We are working on other classes of kernel based algorithms for future improvements over SVM speed and accuracy as well.
Step 3: Here a sensitivity selector will or may be applied, depending on how closely you want to monitor activity
   Example: On a normal day, I might want to set my sensitivity selector to "3" which means I will be monitoring only the important or alarming features.
   But on a sensitive day, I might want to set my sensitivity selector to "5" which means I will be monitoring every feature in the network traffic.

Step 4: Here the final analysis will or may be made, if the activity is found to be malicious; it will or may be directed to the system administrator or in the event of an automated system, the activity will or may be blocked and recorded.

2. Feature Ranking Algorithm

Described below is a general, performance-based input ranking method: One input feature is deleted from the data at a time; the resultant data set is then used for the training and testing of the learning machine classifier. Then the classifier's performance is compared to that of the original classifier (based on all features) in terms of relevant performance criteria. Finally, the importance of the feature is ranked according to a set of rules based on the performance comparison. The procedure is described in computer pseudo-code as follows:

step 1: compose the training set and the testing set; for each feature do the following
step 2: delete the feature from the (training and testing) data;
step 3: use the resultant data set to train the classifier;
step 4: analyze the performance of the classifier using the test set, in terms of the selected performance criteria;
step 5: rank the importance of the feature according to the rules;

To rank the importance of the input features (for example, in the 1998 DARPA intrusion evaluation data, there are 41 features) in an IDS based on SVMs, we consider three main performance criteria: overall accuracy of classification; training time; and testing time. Each feature will be ranked as "important", "secondary", or "insignificant", according to the following sample rules that are applied to the result of a performance comparison of the original 41-feature SVM and the 40-feature SVM. The following set of rules, provided as an example, is used to illustrate the procedure.

Figure 1:
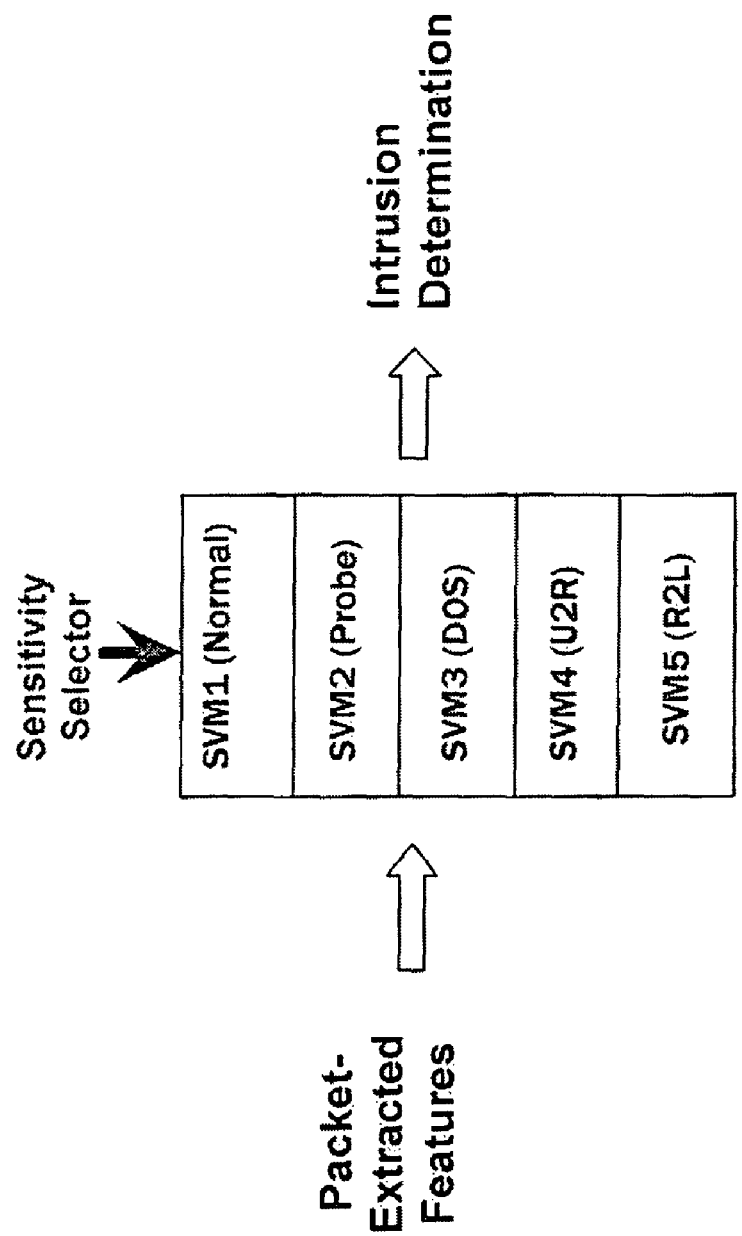
FIG. 1 shows a sample design of the intrusion detection mechanism utilizing five modules.

1. If accuracy decreases and training time increases and testing time decreases, then the feature is important
2. If accuracy decreases and training time increases and testing time increases, then the feature is important
3. If accuracy decreases and training time decreases and testing time increases, then the feature is important
4. If accuracy is unchanged and training time increases and testing time increases, then the feature is important
5. If accuracy is unchanged and training time decreases and testing time increases, then the feature is secondary
6. If accuracy is unchanged and training time increases and testing time decreases, then the feature is secondary
7. If accuracy is unchanged and training time decreases and testing time decreases, then the feature is unimportant
8. If accuracy increases and training time increases and testing time decreases, then the feature is secondary
9. If accuracy increases and training time decreases and testing time increases, then the feature is secondary
10. If accuracy increases and training time decreases and testing time decreases, then the feature is unimportant 3. Multiple Modules for Class-Specific Intrusion Determination FIG. 1 shows a sample design of the intrusion detection mechanism that utilizes five modules. Each module is responsible for detecting attacks belonging to a specific class. The drawing, as an example, is based on the 1998 DARPA intrusion evaluation data, where patterns are determined to be either normal or belonging to one of four classes of attack patterns. In the present invention, each module is or may be implemented as an agent. Currently, we have developed 5 categories of SVM-based modules that may be implemented as agents in this invention. We have also developed 22 individual types of attack instances, and these as well as the categories can be further defined as attacks are added in the future, or as the taxonomy changes in the future. The list of 5 categories includes an alerting module that detects "normal" activity. The other four modules are honed to deal with the four classes of DARPA attacks—Probe, Denial of Service, User to Root and Root to Local. This categorization is carried out in FIG. 1 and is not meant to be an exhaustive list of potential categories of modules.

4. Intrusion Detection Modules (IDMS) Implemented in Intelligent Software Agents Referring to FIG. 1 again, each intrusion detection module is implemented as an intelligent software agent. Each module will determine whether the current input pattern under analysis belongs to the class of patterns for which it is responsible for detection, or not. If two or more modules reach affirmative conclusions, the agent that is responsible for the most serious class of attacks prevails. For example, both module 2 and module 3 report 'YES', indicating that the pattern represents a 'Probe' attack as well as a 'DOS' attack, then the 'DOS' decision prevails.

5. IDS Includes "Sensitivity Selector" to Adjust Intrusion Threshold

Each module in IDS has a sensitivity selector to adjust the threshold of detection. A set of different features from network packets are selected for intrusion detection purpose. Each module, responsible for a specific class of patterns, may use a distinct set of features as selected by the feature ranking algorithm. The module uses more features for low-threshold detection and uses less features for high-threshold detection. Low-threshold detection reduces false negatives and is used in situations where security concern is high; high-threshold detection reduces false positives and is used where and when security concern is low. The sensitivity selector has three settings: Low, Medium, and High. The number of features used for each setting is determined by the feature ranking algorithm.

6. Additional Agents Generated and Dispatched Automatically When IDS Computation Increases The number of peripheral agents assigned to each host or device at any given time is or may be controlled dynamically by the master agent. For example, when a wireless device is seeking connection to network, a peripheral agent will first perform device authentication, followed by user authentication. The agent then extracts features from packets for preliminary intrusion determination. If the amount of network traffic data increases beyond what can be handled by a single agent, a second agent may be dispatched to share the data-gathering and feature extraction computation.

7. Dynamic Agents Management (Assignment/Recall/Modification)

Following data-gathering and feature extraction, an agent will determine if the current pattern is normal or not. If the agent determnes that the current pattern is not normal, the four agents corresponding to 'Probe', 'DOS', 'U2R', and 'R2L' detector modules are dispatched to analyze the pattern. If the pattern is determined to be an attack pattern, another agent may be dispatched to initiate a proper response. Finally, all agents may be recalled once the user/device ends the session and disconnects or log out.

8. Intelligent Software Agents Capable of Learning New Attack Patterns

For patterns determined to be 'suspicious' by the peripheral agents, the controller agent and/or master agent will perform further analysis and make final determination regarding pattern classification. When the controller and master agents determine that an intrusion is occurring or has occurred, the corresponding user activities that have been logged by the peripheral agents will be recognized as constituting a new attack pattern.

9. Intelligent Software Agents Capable of Detecting System Vulnerability

The functions performed by available commercial vulnerability scanners can be implemented in software agents. Customized scanners that check for specific vulnerabilities can be implemented in agents as well. Thus, the present invention of an agent-based distributed IDS provides the capability for system vulnerability scanning.

10. Suitable for Wireless Network IDS

Figure 3:
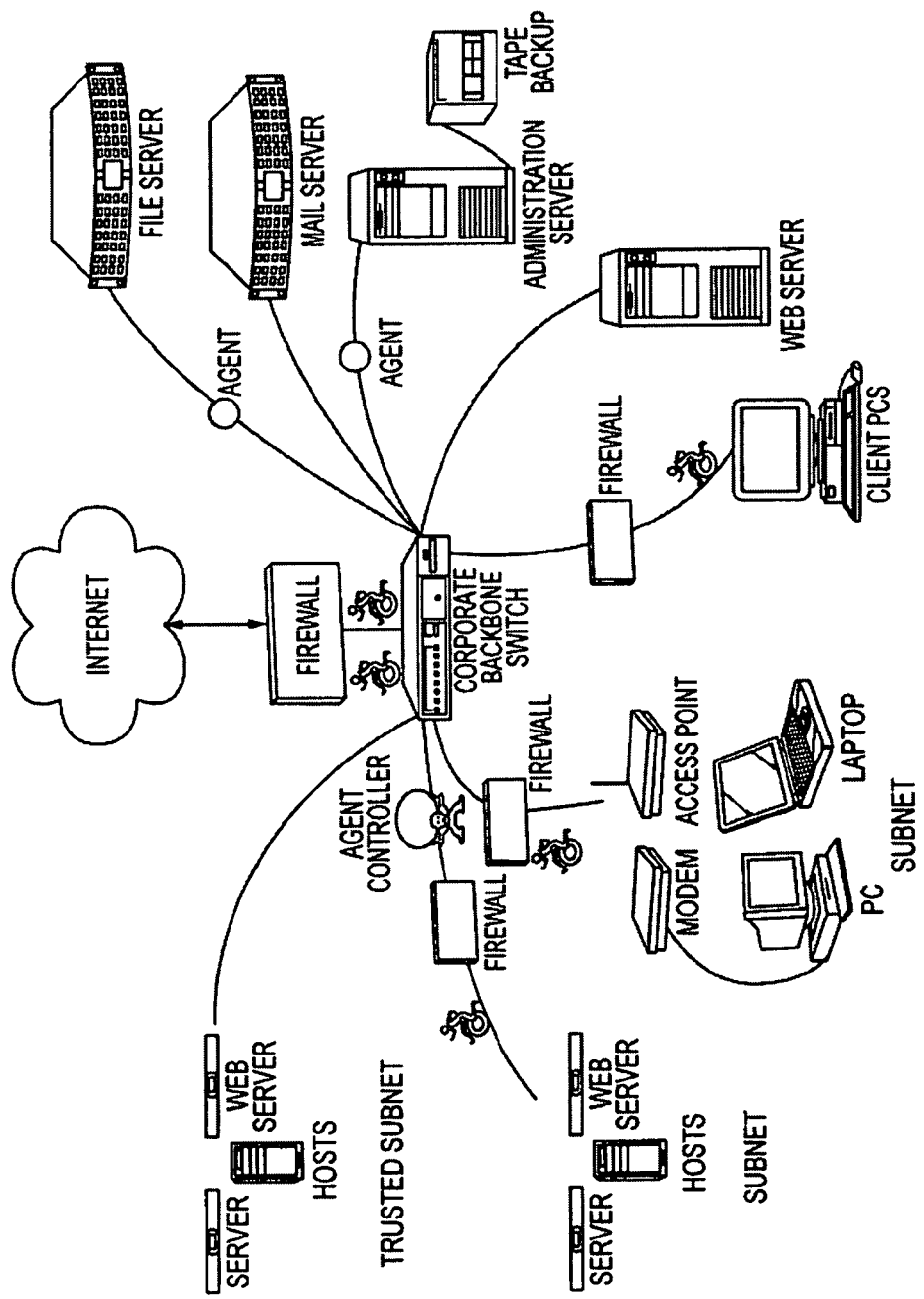
FIG. 3 shows a distributed IDS architecture for enterprise network.

As shown in FIG. 2 and FIG. 3, the present invention of an agent-based distributed IDS is applicable to networks including wireless access points that allow standard wireless networking and ad-hoc wireless networking of wireless devices of different types.

11. Applicable to All OS and Architecture Platforms

The present invention of agent-based, distributed IDS is or may be operating system (OS)-independent and architecture-independent. The only requirement is that the hosts on the network, and wireless devices seeking connection to the network, can support and run the software agents.

12. Applicable to All Network Configurations

As shown in FIG. 2 and FIG. 3, the present invention is applicable to all network configurations. The only limitations that affect the applicability of the present invention of an agent-based distributed IDS are the physical ones imposed by the hardware resource of the servers, hosts, and devices, including memory size, processor speed, and network bandwidth.

13. System Capable of Detecting Anomalous Patterns and Misuse/Attack Patterns Using IDMs As explained in 1.-8. above, the misuse or attack detection function is implemented, in a distributed fashion, in the agents. In other words, the peripheral, controller, and master agents collaborate to detect misuse or attack patterns. The anomaly detection function of current IDSs can also be implemented in the collective agents. Hence, the present invention provides for the detection of both anomalous patterns and misuse/attack patterns.

14. IDS Includes Prevention and Response Mechanisms

The prevention mechanism is provided, for example, when peripheral agents detect suspicious activities from a group of users and respond by terminating their connections, thus preventing a distributed DOS attack from taking effect. The response mechanism is or may be provided, for example, when a controller agent detects with certainty that intrusion is occurring, a master agent then directs the connection to a honey pot while simultaneously generates and dispatches peripheral agents to start attack tracing.

15. Increased Scalability, Accuracy, and Real-Time Performance

The increased performance in pattern scalability, or the ability of the IDS to learn larger and larger numbers of attack patterns, is or may be provided by the SVMs using suitable kernel functions. The increased network scalability, or the ability of the IDS to protect a network with increasing number of hosts and devices, is or may be provided by the use of agents which are generated and dispatched dynamically, in accordance with the network size, intrusion-detection computation load, and traffic conditions. The real-time performance is provided by the use of a collection of agents that share the computation and make intrusion determination decisions collectively, thus eliminating bottlenecks that are likely created by a centralized IDS.

DETAILED DESCRIPTION OF THE DRAWINGS

Referring now to the drawings in detail, FIG. 1 shows SVM-based intrusion detection modules (example based on 5-class of patterns), where each module is implemented as an agent. In particular, in the notional process in FIG. 1, packet features are monitored or extracted in real time by the mobile agents. The sampling rate of this monitoring is controlled by the Sensitivity Selector.

The first agent (or deployed feature ranking algorithm), known as SVM1, observes the features of the packet and based on prior experience determines whether or not the packet is normal/harmless or if it may possibly be a more harmful packet that falls into one of the four DARPA categories for malicious packets. If the packet is determined not to be normal, it will immediately summon SVMs 2-5 to assist it in determining what type of attack this packet may contain.

The second agent, known as SVM2, observes the features of the packet and based on prior experience determines whether or not the packet has characteristics associated with a Probe class of attack.

The third agent, known as SVM3, observes the features of the packet and based on prior experience determines whether or not the packet has characteristics associated with a Denial of Service (or DOS) class of attack.

The fourth agent, known as SVM4, observes the features of the packet and based on prior experience determines whether or not the packet has characteristics associated with a User to Root (or U2R) class of attack.

The fifth agent, known as SVM5, observes the features of the packet and based on prior experience determines whether or not the packet has characteristics associated with a Root to Local (or R2L) class of attack.

If SVMs 2-5 determine that the attack falls into a malicious category, they will report this back to the central controller agent and then carry out whatever reactions have been preprogrammed as an appropriate response. Appropriate responses might include terminating the connection, or increasing the monitoring and awareness of what the intruder is doing on the system in order to gain more time to collect data for possible criminal prosecution.

FIG. 2 shows an example of the architecture of a distributed IDS for a network that might include both wired and wireless components.

- Peripheral Agents may have the following functionality:
  Authentication (of wired & wireless devices and users)
  Data collection and feature selection (for building user profiles, statistics monitoring, and intrusion detection purposes)
  Preliminary intrusion risk assessment (rank user's risk as minimal/low/medium/high/severe, etc.)
  Communication (share data with other agents)
  Response (including terminate connection, notify other agents, start user tracing, etc.)
  Perform vulnerability scanning
- Controller Agents may have the following functionality:
  Communication (receive data from Peripheral agents for intrusion determination, send instruction to peripheral agents, etc.); send/shared data with master agents
  Intrusion determination (including port scan detection, statistics monitoring, DoS monitoring, signature matching, etc.)
  Response (including honey potting, start attack tracing, etc.)
  Perform vulnerability scanning
- Master Agents may have the following functionality:
  Assign/Recall/Modify other agents
  Update and maintain profiles and signatures
  Intrusion determination (DDoS monitoring, attack pattern matching, etc.)
  Response
  Initiate/terminate vulnerability scanning Both FIGS. 2 and 3 represent example implementations and the extreme flexibility that is made possible by the agent-based and SVM-based IDS system. These two drawings are made to convey that agents such as these can be deployed to:

- Monitor a variety of platforms by deploying agents that are uniquely tailored to the type of device that is of interest (a PDA agent is quite different from a laptop agent, and so forth)
- Monitor a network of widely varying components and size
- Monitor activity on all types and protocols of wired and wireless network traffic
- Monitor activity behind and in front of a variety of different firewalls
- Monitor activity on a geographically isolated collection of subnets The present invention is, of course, in no way restricted to the specific disclosure of the specification and drawings, but also encompasses any modifications within the scope of the appended claims.

We claim:

1. A method of detecting intrusions on at least one computer in a computer network, including the steps of:
   providing a computer-readable medium encoded with an intrusion detection system, said intrusion detection system comprising a feature ranking algorithm configured to extract features of interest from a network and network activity; a plurality of support vector machines, wherein each of said support vector machines is a kernel-based algorithm configured to analyze extract features of interest to determine whether said extracted features are normal or malicious;
   using said feature ranking algorithm to extract features of interest from a network and network activity;
   using said kernel-based algorithm to analyze extracted features of interest to determine if said extracted features are normal or malicious;
   if said extract features are determined to be malicious, causing said activity to be denied prior to access, terminated after access, limited in scope, honey-potted or tracked; and
   based on whether said activity is denied prior to access, terminated after access, limited in scope, honey-potted or tracked, determining that an intrusion onto said computer has occurred.

2. The method according to claim 1, wherein said step of analyzing is accomplished semi-autonomously, and is tailored to a specific device being monitored.

3. The method according to claim 2, wherein said device being monitored includes network devices including routers, switches, hubs and access points; perimeter defense devices including firewalls, VPNs and authentication devices; and peripheral wired and wireless devices including PDAs, cell phones, laptops, PCs and servers.

4. The method according to claim 2, wherein a hierarchy of agents is provided to effect said semi-autonomous analysis.

5. The method according to claim 4, wherein said agents accomplish at least one of assessing risk at their dispatched location, providing management functions, collecting data, communicating and coordinating with one another, sharing computational resources, providing vulnerability scanning, and providing authentication.

6. The method according to claim 4, which includes altering a sensitivity level of an agent's analysis.

7. The method according to claim 4, wherein said management functions include dispatching an appropriate number and type of agents, monitoring and controlling dispatched agents, recalling dispatched agents, and reprogramming or updating agents.

\* \* \* \* \*